June 20, 1967     L. A. KAMENTSKY     3,327,117
CANCER CELL DETECTOR USING TWO WAVELENGTHS FOR COMPARISON
Filed Aug. 12, 1963     3 Sheets-Sheet 1

INVENTOR
LOUIS A. KAMENTSKY

BY *Francis J. Thomas*
ATTORNEY

United States Patent Office 3,327,117
Patented June 20, 1967

3,327,117
CANCER CELL DETECTOR USING TWO WAVE-LENGTHS FOR COMPARISON
Louis A. Kamentsky, Briarcliff Manor, N.Y., assignor to International Business Machines Corporation, New York, N.Y., a corporation of New York
Filed Aug. 12, 1963, Ser. No. 301,265
14 Claims. (Cl. 250—83.3)

This invention is related to methods and apparatus for recognizing patterns and, in particular, to techniques that are useful in diagnosing cancer.

A widely-used technique for reliably analyzing smears of body fluids is described in a publication entitled, Diagnosis of Uterine Cancer by the Vaginal Smear, by G. N. Papanicolaou and H. F. Trout, published by Commonwealth Fund, New York, 1943. Further information describing this technique is found in a publication entitled. Atlas of "In Situ" Cytology, by S. Charles Kasdon and Sophia B. Bamford, published by Little, Brown and Co., Boston, 1962. This procedure is commonly referred to as the Papanicolaou technique. Cancer cells which are exfoliated into body fluids are detectable upon microscopic analysis of stained smears of the body fluid by highly-trained personnel. This procedure enables certain types of cancer to be detected at an early and curable stage. Using the Papanicolaou procedure, cancer cells are distinguished from normal cells using several interrelated parameters including:

(1) Nuclear diameter, which is generally larger for cancer cells, (2) Cytoplasmic diameter, which is generally smaller for cancer cells, (3) Nuclear shape, which is often irregular for cancer cells, (4) Amount of nuclear chromatin, where the nucleus contains a higher level due to the presence of more deoxyribonucleic acid (DNA) and ribonucleic acid (RNA) for cancer cells, (5) Amount of cytoplasmic stain density, where the cytoplasm contains a higher level due to the presence of more RNA for cancer cells, (6) Nuclear inhomogeneity, where clumping of chromatin occurs in cancer cells, (7) The relative parameters (above) with respect to average parameters in the sample, (8) Isolation of cells, where cancer cells tend to isolate.

The success of this cancer detection technique in diagnosing cancer, often at an early and curable stage, makes it highly desirable to extend the technique to a mass examination of the human population. The utility of the techniques is limited, however by the requirement of highly-trained personnel employed in a time consuming and tedious task. Their procedure is outlined in a publication entitled A Manual of Cytotechnology, published by the National Committee for Careers in Medical Technology, 1962, and represents the result of a cooperative effort of group of experts in this field of medicine. Because of the complexity of cancer diagnosis using these techniques, widespread testing is virtually impossible without some degree of automation which would at least indicate the clearly negative cases so that the cytotechnologist need only be concerned with a fraction of the total cases.

An attempt has been made to automate the screening process based on measurements of the size and visible light absorption of the nuclei of specially stained and isolated cells and is described in a publication entitled Exfoliated Cell Studies and the Cytoanalyzer, by E. G. Diacumakos, Emerson Day and M. J. Kopac, published in the Annals of the New York Academy of Sciences, volume 97, article 2, June 5, 1962, at pages 498–513. Another attempt to automate the screening process based on the flourescence of cells stained with a fluorescent dyestuff is described in a publication entitled A Microfluorometric Scanner for the Differential Detection of Cells: Application to Exfoliative Cytology, by Robert C. Mellors and Reuben Silver, published in Science, volume 114, Oct. 5, 1951, at pages 356–360. Neither of these studies are known to have resulted in successful automation devices.

Present pattern recognition systems are generally incapable of recognizing cancer cells based on the Papanicolaou technique because the above-described parameters are only subtly different between cancer and normal cells and diagnosis is nearly intuitive in some cases. Thus, a system that can reliably recognize printed characters and similar data cannot reliably recognize cell patterns. Present technology does, however, have certain capabilities which exceed the power of human visual inspection. Machines are capable of simultaneously examining two or more responses, measuring distances very precisely, operating with energy frequencies that are outside of the visual spectrum, accurately measuring the intensity of minute portions of energy patterns, operating at tremendous speeds, etc. Thus the problem of automating cancer detection can best be solved by deriving a non-subtle distinction between cancer and normal cells that fall within the capabilities of machine recognition. In the present invention two significant distinctions between cancer and normal cells are used to provide reliable diagnosis techniques and machines to automate the diagnosis are shown and described.

In the present invention, cancer cells are distinguished from normal cells by measurements of the relative amount of nucleic acids (DNA and RNA) in the nucleus and cytoplasm of the cells and by measurements of the distribution of these acids. The measurements rely on the absorption of ultraviolet light energy at certain wavelengths by nucleic acids. Ultraviolet light absorption by nucleic acids and proteins and the correlation between the increase of the concentration of cytoplasmic nucleic acid with the increase in the rate of protein synthesis is described in publications entitled Microspectrometry of Living and Fixed Cells, by H. G. Davies and P. M. B. Walker, in Progress in Biophysics and Biophysical Chemistry, edited by J. A. V. Butler and J. T. Randall, vol. 3, 1953, published by Academic Press, New York, Chapter 7, at pages 195–236; and The Ultraviolet Spectrum of Deoxyribonucleic Acids and Their Constituents, by E. Fredericq, A. Oth and F. Fontaine, in the Journal of Molecular Biology, volume 3, 1961, at pages 11–17. Ultraviolet absorption measurements and comparisons for cancer and normal squamous cells is described in publications entitled Nucleic Acid Content of the Squamous Cancer Cell, by Robert C. Mellors, John F. Keane, Jr., and G. N. Papanicolaou, in Science, volume 116, Sept. 12, 1952, at pages 265–269; and The Reflecting Microscope, by Robert C. Mellors, in Science, volume 112, Oct. 6, 1950, at pages 381–388. Two additional related references are: The Use of Television and Scanning Techniques for Ultraviolet Irradiation Studies of Living Cells, by P. O'B. Montgomery and L. L. Hundley, in the Institute of Radio Engineers (now Institute of Electrical and Electronics Engineers) Transactions on Medical Electronics, July 1960, at pages 135–138; and Ultraviolet Television Color-Translating Microscope, by V. K. Zworykin and Fred L. Hatke, in Science, volume 126, Oct. 25, 1957, at pages 805–810.

The present invention is based on discoveries which are related to the following data that is described in the above-cited references:

(1) Both RNA and DNA absorb ultraviolet light energy with an absorption maximum at about 2600 A.

(2) Certain proteins absorb ultraviolet light energy with an absorption maximum at about 2800 A.

(3) The average amount of DNA in the nucleus and the volume of the nucleus are greater in a cancer cell than in a normal cell.

(4) The increased protein synthesis rate of a cancer cell results in a greater concentration of cytoplasmic RNA than in a normal cell.

The present invention is based on the discovery and use of two additional factors which are apparent in cells in smears that may or may not be stained according to the Papanicolaou technique. First, it has been found that the absorption profiles across a cross-section of cells for energy at two wavelengths (a wavelength that is significantly absorbed and a wavelength that is not significantly absorbed by nucleic acids but that is absorbed by other cell constituents or by the stain) are significantly different for cancer cells than they are for normal cells. In particular, normal cells provide absorption profiles that are similar for energy at both wavelengths whereas cancer cells provide absorption profiles that are dissimilar. Second, it has been found that the absorption profile of energy at a wavelength that is significantly absorbed by nucleic acids across a cross-section of a cancer cell describes a relatively smooth rounded curve, whereas the corresponding absorption profile by normal cells is an irregular curve with significantly higher frequency components. Each of these distinctions is so pronounced that relatively simple and inexpensive apparatus can reliably diagnose a stained smear for the presence of cancer cells. Although the distinctions can also be observed by highly trained technicians without automation, they are particularly useful as the basis of operation of automatic detection apparatus because the distinctions are based on measurements of the type at which machines function more efficiently than human beings.

It is thus an object of the present invention to provide pattern recognition techniques which are useful in the examination of biological specimens.

Another object is to provide methods and apparatus for the diagnosis of animal cells.

Another object is to provide recognition techniques for diagnosing cancer.

A further object is to provide recognition techniques which enable cancer cells to be distinguished from normal cells.

Another object is to provide methods and apparatus for analyzing the nucleic acid content of cells.

Another object is to provide methods and apparatus for analyzing the nucleic acid content of cells by subjecting the cells to energy at wavelengths that are absorbed by nucleic acids.

Another object is to provide methods and apparatus for analyzing the nucleic acid content of cells by subjecting the cells to energy at wavelengths that are absorbed by nucleic acids and to energy at wavelengths that are not absorbed by nucleic acids.

A further object is to provide techniques for analyzing cells based on the relative absorption profiles of energy at a wavelength that is absorbed by nucleic acids and energy at a wavelength that is not absorbed by nucleic acids.

A still further object is to provide methods and apparatus for analyzing cells based on the shape of the absorption profile of energy at a wavelength that is absorbed by nucleic acids.

A still further object is to provide techniques for analyzing cells based on the frequency content of the absorption profile of energy at a wavelength that is absorbed by nucleic acids.

A still further object is to provide techniques for diagnosing cells to be cancer cells when the relative absorption profiles of energy at a wavelength that is absorbed by nucleic acids and energy at a wavelength that is not absorbed by nucleic acids are significantly different in shape.

A still further object is to provide techniques for diagnosing cells to be cancer cells when the relative absorption profile of energy at a wavelength that is absorbed by nucleic acids describes a relatively smooth curve.

The foregoing and other objects, features and advantages of the invention will be apparent from the following more particular description of preferred embodiments of the invention, as illustrated in the accompanying drawings.

Figure 1:
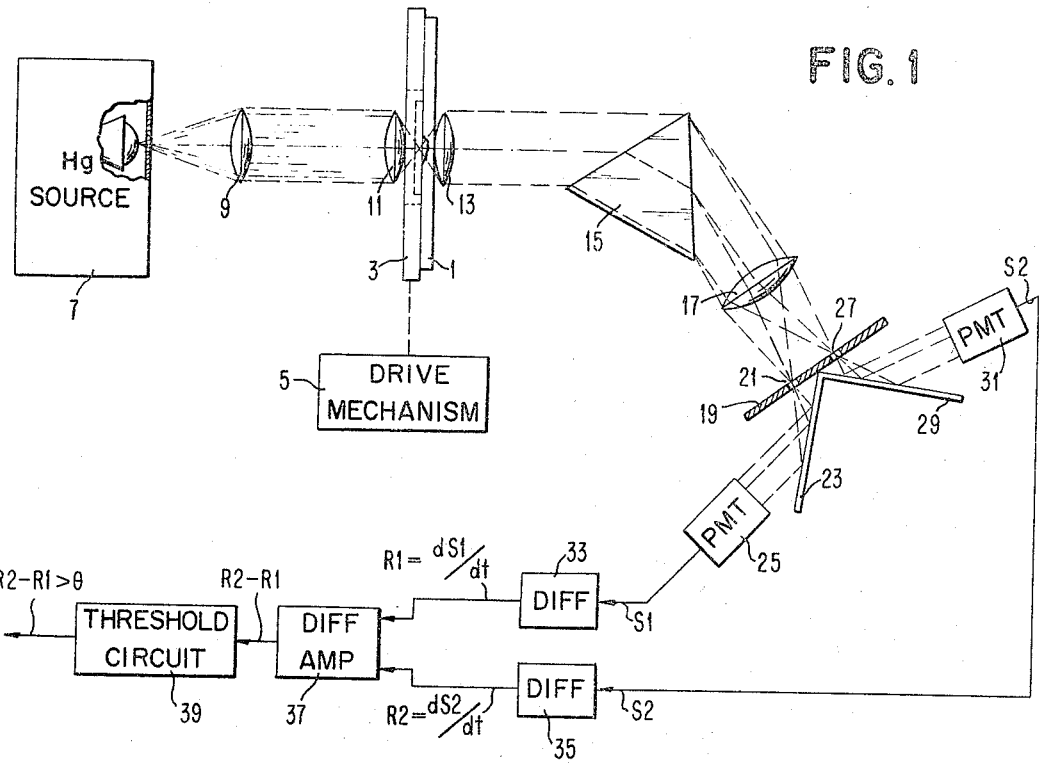
FIGURE 1 is a diagram of a preferred embodiment of an apparatus for diagnosing cancer.

The invention is particularly described with respect to the diagnosis of cervical cancer but is also useful in the diagnosis of many types of cancer. Smears are obtained and fixed and stained according to the Papanicolaou technique but quartz slides and cover slips are substituted for the normally-used glass slides. The stain highlights the morphology of the cell. In FIGURE 1, the specimen is located on the slide 1 which is held by a frame 3 that is mechanically moved by a drive mechanism 5. The slide undergoes a sequence of relatively high speed vertical moments as it is moved in the horizontal direction at a relatively low speed. In this manner, a fixed position optical system effectively scans the specimen with a raster of adjacent vertical lines.

A mercury light source 7 supplies energy at a number of wavelengths, including 2652 A. and 5460 A. The ultraviolet light energy at 2652 A. is within the range of wavelengths that are substantially absorbed by nucleic acids and the green light energy at 5460 A. is without this range, but is within the absorption range of the stain. The wavelength of the energy that is not to be absorbed by nucleic acids is not critical—the invention has been successfully operated with energy at a wavelength of 2976 A., which is within the absorption range of the proteins in the cells.

The light emanating from the source 7 is collimated by a lens 9 and focused on the specimen by a microscope objective 11. The energy that is transmitted by the specimen is applied through another microscope objective 13 to a prism 15. The prism separates the light energy at the different wavelengths and a lens 17 focuses the energy at the plane of a stop 19. The short wavelength energy at 2652 A. (in the nucleic acid absorption band) is passed through an aperture 21 in the stop 19 and reflected by a mirror 23 to a photomultiplier 25. The long wavelength energy at 5460 A. (outside of the nucleic acid absorption band) is passed through another aperture 27 in the stop 19 and is reflected by a mirror 29 to a photomultiplier 31. The optical system described above is comprised of commercially-available and well-known components. A text describing the operation of components of this type is entitled Fundamentals of Optics, by Francis A. Jenkins and Harvey E. White, Third Edition, published by the McGraw-Hill Book Company, New York, 1957. The operation of the prism 15 is described in detail in this reference at page 301. The optical system shown in FIGURE 1 may be modified in many obvious ways. For example, the prism arrangement may be replaced by a dichroic mirror or a filter arrangement and either or both mirrors 23 and 29 can be eliminated. In addition, instead of moving the specimen with the drive mechanism, the specimen can be fixed in position and scanned by a movable beam of energy from a Nipkow disc scanner or a flying spot cathode ray tube scanner. A source that provides energy at unrequired wavelengths as well as at required wavelengths can be used, as the stop 19 will block this energy from reaching the photomultipliers. Furthermore, the system can utilize light energy reflected by the specimen instead of transmitted energy.

Figure 3:
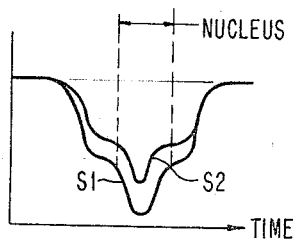
FIGURE 3 is a diagram illustrating theoretical, idealized signals that are present in the embodiments of FIGURES 1 and 2 when normal cells are analyzed.
Figure 4:
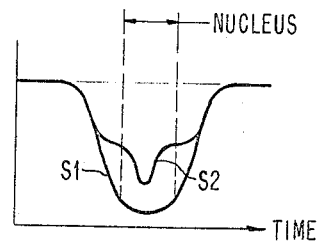
FIGURE 4 is a diagram illustrating theoretical, idealized signals that are present in the embodiments of FIGURES 1 and 2 when cancer cells are analyzed.
Figure 5:
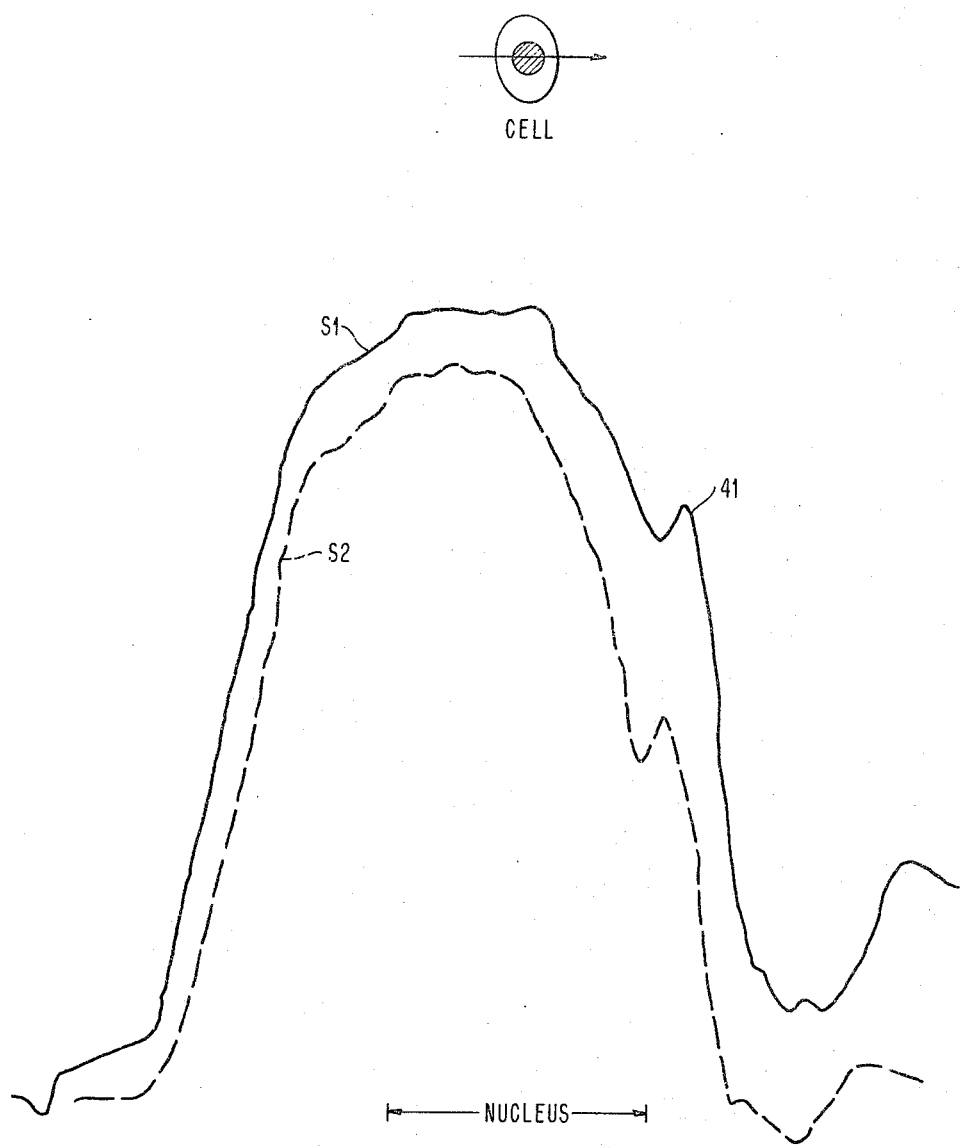
FIGURE 5 is a diagram indicating at the top the scanning of a cell and illustrating at the bottom typical signals that are present in the embodiments of FIGURES 1 and 2 when normal cells are analyzed.
Figure 6:
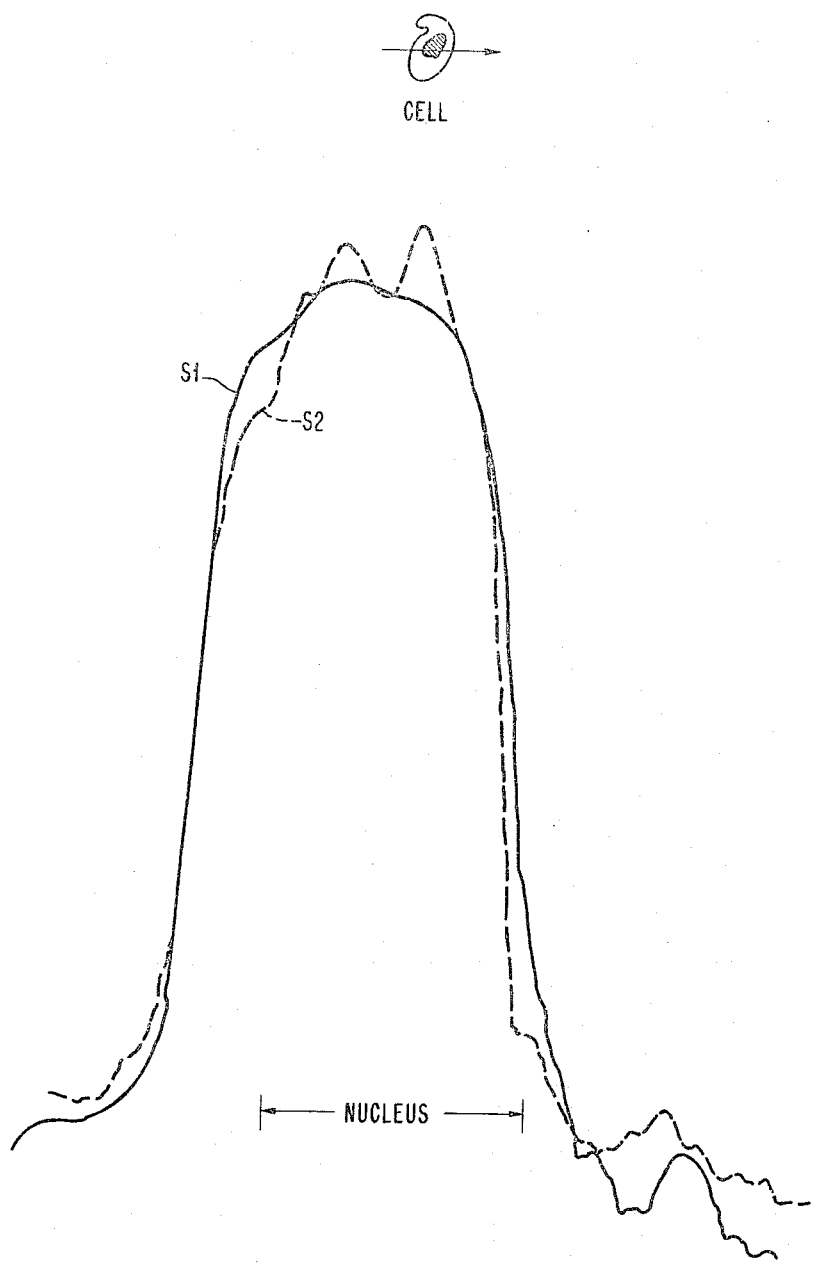
FIGURE 6 is a diagram indicating at the top the scanning of a cell and illustrating at the bottom typical signals that are present in the embodiments of FIGURES 1 and 2 when cancel cells are analyzed.

The photomultipliers 25, 31 generate electrical signals S1 and S2, on lines similarly designated, whose amplitudes are a function of the intensity of the energy transmitted by the specimen at the wavelengths selected by the prism 15, lens 17 and apertures 21 and 27. FIGURE 3 shows idealized voltage curves S1 and S2 that are obtained at the outputs of the photomultipliers 25 and 31 as the cross-section of a normal cell is scanned as indicated at the top of FIGURE 5. The signals S1 and S2 have generally similar shapes, indicating that the nucleic acid concentration (related to S1) in a normal cell is similar to the protein and other matter concentration (related to S2). Idealized signals from scanning a cancer cell, as indicated at the top of FIGURE 6, are shown in FIGURE 4, where the signal S2 (related to the energy outside of the nucleic acid absorption band that is transmitted by the specimen) has the same shape as that produced for a normal cell (FIGURE 3). The S1 signal for a cancer cell is not similar in shape to the S2 signal for the cancer cell, nor is it similar to the S1 signal for a normal cell. The S1 signal for a cancer cell (FIGURE 4) indicates that nucleic acids are concentrated not only in the nucleus, but are spread into the cytoplasm. The system shown in FIGURE 1 distinguishes cancer cells from normal cells by analyzing the relative shapes of the S1, S2 signals, with a cancer cell providing a significant difference in relative shapes that is not present for a normal cell.

The difference in shape between signals S1 and S2 that is present when a cancer cell is scanned is accentuated by analyzing a derivative function of the signals. In the preferred embodiment, the first derivatives of the signals are generated by differentiator circuits 33, 35, where R1 is the first derivative $dS1/dt$ of S1 and R2 is the first derivative $dS2/dt$ of S2. The signals R1 and R2 are compared by a difference amplifier 37 which generates the signal R2–R1. This difference signal is compared to a threshold $\phi$ by a circuit 39 and when the difference exceeds the threshold an output signal is provided which indicates that the scanned cell is likely to be a cancer cell.

The morphology of normal and cancer cells is illustrated in greater detail by the typical, non-idealized signals shown in FIGURES 5 and 6. Scanning of a normal cell, as indicated at the top of FIGURE 5 provides signals S1 and S2 of the type shown in FIGURE 5, where it can be observed that the signals have the same general shape. A cancer cell scanned as indicated at the top of FIGURE 6, provides signals S1 and S2 of the type shown in FIGURE 6 where it can be observed that the signals are significantly dissimilar in shape. The presence of a substantially greater amount of nucleic acid in a cancer cell than in a normal cell is signified by the regular, smooth signal S1 in FIGURE 6.

In order to enable trained personnel to further diagnose the suspected cell the area of the slide that is being scanned can be monitored by the scanning apparatus (the drive mechanism in the preferred embodiment) and an indication provided to assist the technician in the location of the suspected cell.

Figure 2:
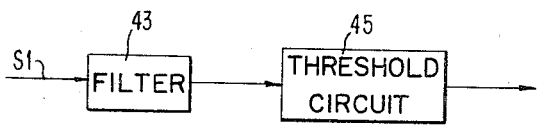
FIGURE 2 is a diagram of an apparatus which is substituted for a portion of the apparatus shown in FIGURE 1, as a second embodiment.

In a second embodiment of the invention, light energy at only one wavelength is analyzed. The S1 output of photomultiplier 25 is applied to the circuits shown in FIGURE 2. As shown in FIGURES 3, 4, 5 and 6, the S1 signal is significantly different for a cancer cell than for a normal cell. Since nucleic acids are present in considerable quantities in the cytoplasm of a cancer cell, the S1 signals in FIGURES 4 and 6 are a smooth curve. In a normal cell, the nucleic acid concentration is predominantly in the nucleus and the related signal S1 in FIGURES 3 and 5 contain a less blunt shape with higher frequency components. The irregularity 41 in the S1 signal for a normal cell (FIGURE 5) occurs near the boundary of the nucleus. The S1 signal is applied to a filter 43 in FIGURE 2 which generates a signal indicative of the amount of energy in the S1 signal that is in the range of frequencies which includes the frequency of the irregularity 41 in FIGURE 5. The range of frequencies is a function of the scanning rate and is not critical because the S1 signals produced by a cancer cell are significantly different in shape than the signals produced by a normal cell. The output of the filter 43 is compared to a threshold $\theta$ in a circuit 45 and an output signal is provided when the scanned cell is a normal cell.

Since only a single wavelength of light energy in the range absorbed by nucleic acids (e.g. 2652 A.) is required in the second embodiment, the apparatus shown in FIGURE 1 which generates the S1 signal can be used directly or can be simplified. The energy that is transmitted by the specimen can be passed through a single filter to a single photomultiplier, instead of using the prism, lens, stop and mirror arrangement that is shown.

The pattern recognition techniques that have been described are particularly useful in diagnosing cancer. The discovery that normal cells provide absorption profiles that are similar in shape for energy at a wavelength within the absorption range of nucleic acids and at a wavelength that is not within this range, whereas cancer cells provide significantly different absorption profiles enables diagnosis by automatic recognition apparatus and by visual inspection. The further discovery that the absorption profiles for cancer and normal cells are significantly different in shape (frequency content) for energy at a wavelength in the absorption range of nucleic acids can also be used for diagnosis by automatic recognition apparatus and by visual inspection. Obviously the discoveries can be utilized together in a single machine, if desired.

While the invention has been particularly shown and described with reference to a preferred embodiment thereof, it will be understood by those skilled in the art that various changes in form and details may be made therein without departing from the spirit and scope of the invention.

What is claimed is:
1. The method of recognizing cancer cells, comprising the steps of:
   directing electromagnetic energy having a first wavelength at a portion of a cell, where the wavelength is within the range of wavelengths that is substantially absorbed by a nucleic acid;
   directing electromagnetic energy having a second wavelength at said portion of said cell, where the wavelength is without the range of wavelengths that is substantially absorbed by a nucleic acid;
   and identifying the cell as a cancer cell when a predetermined function including the derivative of the absorption profile of the energy at the first wavelength differs from a predetermined function of the absorption profile of the energy at the second wavelength by a threshold amount.
2. The method described in claim 1, wherein the first wavelength is less than 2700 A.
3. The method described in claim 1, wherein the first wavelength is approximately 2650 A.
4. The method described in claim 1, wherein the second wavelength is greater than 2700 A.
5. The method described in claim 1, wherein the second wavelength is within the range absorbed by proteins.
6. The method described in claim 1, wherein the cells are pre-stained with a dye and wherein the second wavelength is within the range of wavelengths absorbed by the dye.

7. The method described in claim 1, wherein the second wavelength is approximately 3000 A.

8. The method of recognizing a cancer cell, comprising the steps of:
- scannning a portion of a cell with a beam of electromagnetic energy, having energy at a first wavelength that is within the range of wavelength that is substantially absorbed by a nucleic acid and having energy at a second wavelength that is without the range of wavelengths that is substantially absorbed by a nucleic acid;
- and identifying the cell as a cancer cell when a predetermined function including the derivative of the absorption profile of the energy at the first wavelength differs from a predetermined function of the absorption profile of the energy at the second wavelength by a threshold amount.

9. An apparatus for diagnosing animal cells comprising, in combination:
- means for directing electromagnetic energy having a first wavelength at the cell, where the wavelength is within the range of wavelengths that is substantially absorbed by a nucleic acid;
- means for directing electromagnetic energy having a second wavelength at the cell, where the wavelength is without the range of wavelengths that is substantially absorbed by a nucleic acid;
- and means for identifying the cell as a cancer cell when the difference in voltage of the derivative of the absorption due to the difference in the absorption profiles across the cell exceeds a threshold.

10. An apparatus for diagnosing animal cells comprising, in combination:
- means for scanning a cell with a beam of electromagnetic energy, having energy at a first wavelength that is within the range of wavelength that is substantially absorbed by a nucleic acid and having energy at a second wavelength that is without the range of wavelengths that is substantially absorbed by a nucleic acid;
- and means for identifying the cell as a cancer cell when a predetermined function including the derivative of the absorption profile of the energy at the first wavelength differs from a predetermined function of the absorption profile of the energy at the second wavelength by a threshold amount.

11. An apparatus for diagnosing a specimen of cells in a stained smear that is located on a slide comprising, in combination:
- means for scanning a region of the slide that contains cells, with a raster of electromagnetic energy, where a wavelength of the energy is within the range of wavelengths that is substantially absorbed by a nucleic acid and where a wavelength of the energy is without this range;
- optical wavelength-sensitive means responsive to the energy at said wavelengths that is emanated by the specimen for directing energy at the first of said wavelengths along a first path and for directing energy at the second of said wavelengths along a second path;
- a first sensing means responsive to the energy in the first path for generating a first electrical signal which is related to the intensity of said energy;
- a second sensing means responsive to the energy in the second path for generating a second electrical signal which is related to the intensity of said energy;
- and means responsive to the first and second electrical signals for providing an indication that the scanned cell is a cancer cell when a derivative function of one of said signals exceeds a derivative function of the other of said signals by a threshold amount.

12. The apparatus described in claim 11, wherein the first wavelength is approximately 2650 A.

13. The apparatus described in claim 11, wherein the second wavelength is greater than 2700 A.

14. A method of recognizing a cancer cell, comprising the steps of:
- directing electromagnetic energy having a first wavelength which is responsive to the presence of a nucleic acid at at least a portion of said cell to provide a signal indicative of the quantity of a nucleic acid only in said cell,
- directing electromagnetic energy having a second wavelength which is responsive to cellular material other than said nucleic acid at at least said portion to provide a signal indicative of the quantity of said cellular material only in said cell,
- and identifying said cell as a cancer cell when the signal at said first wavelength differs from the signal at said second wavelength by a threshold amount.

References Cited

UNITED STATES PATENTS

| | | | |
|---|---|---|---|
| 2,395,489 | 2/1946 | Major et al. | 250—83.3 X |
| 2,790,438 | 4/1957 | Taplin et al. | 128—2 |
| 3,210,546 | 10/1965 | Perron | 250—83.3 |

OTHER REFERENCES

Mellors et al.: A Microfluorometric Scanner, Science, vol. 114, Oct. 5, 1951, pp. 356–360.

Mellors et al.: Nucleic Acid Content of the Squamous Cancer Cell, Science, vol. 116, Sept. 12, 1952, pp. 265–269.

RALPH G. NILSON, *Primary Examiner.*

S. ELBAUM, *Assistant Examiner.*